April 17, 1962  R. L. MYERS  3,030,119
HAND AND POWER OPERATED COLLET CHUCK
Filed Jan. 5, 1961  2 Sheets-Sheet 1

INVENTOR.
RICHARD L. MYERS
BY
Meyer, Baldwin, Doran & Young
ATTORNEYS

April 17, 1962 R. L. MYERS 3,030,119
HAND AND POWER OPERATED COLLET CHUCK
Filed Jan. 5, 1961 2 Sheets-Sheet 2
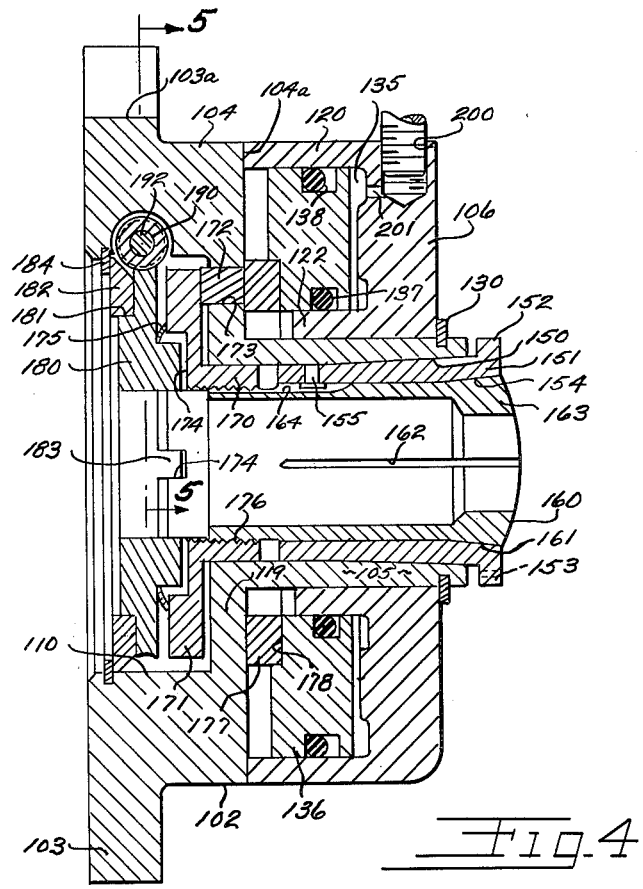
INVENTOR.
RICHARD L. MYERS
BY
Meyer, Baldwin, Doran & Young
ATTORNEYS United States Patent Office 3,030,119
Patented Apr. 17, 1962

3,030,119
HAND AND POWER OPERATED COLLET CHUCK
Richard L. Myers, 1641 E. 276th St., Euclid, Ohio
Filed Jan. 5, 1961, Ser. No. 80,798
19 Claims. (Cl. 279—4)

This invention relates to a collet chuck of the type used in machine tools such as drill presses, lathes, milling machines, and the like. The present invention is specifically directed to a collet chuck of the above type wherein the collet portion thereof may be contracted or expanded alternatively either by manual means or by the application of fluid under pressure.

An important object of this invention is to provide a collet chuck for holding a tool or workpiece, the principle of which is adaptable to either a machine wherein the gripped element is rotated or one in which said gripped element is fixedly held.

Another object of this invention is to provide such a collet chuck which, when applied to a machine such as a lathe wherein the gripped element is rotated, the collet portion thereof can be contracted or expanded without stopping the machine.

A further object of this invention is to provide a collet chuck having the above characteristics which may be operated manually when for any reason it is not feasible to operate the same by pressurized fluid.

Still another object of this invention is to provide a collet chuck and actuating mechanism embodying the above features wherein means is provided for correcting any eccentricity between the machine tool spindle and the collet.

A further object of this invention is to provide a collet chuck which will utilize to full advantage the capacity of the machine tool to which it is mounted.

Generally, it is the object of this invention to provide a collet chuck incorporating the above characteristics which is sturdy and compact in construction and which can be quickly and easily installed on standard machine tools of various types.

Two embodiments of the collet chuck of the present invention are herein illustrated and described, a first embodiment showing a chuck adapted for use with a rotary machine tool such as a lathe wherein the gripped element is adapted to be rotated and a second embodiment showing the chuck as adapted for use with a non-rotary machine tool such as a milling machine wherein the gripped element is rigidly and fixedly held during the machining operation. It will be understood that these two embodiments are given by way of illustrations of the uses to which the invention may be put and are not intended to limit the scope of the invention.

Figure 1:
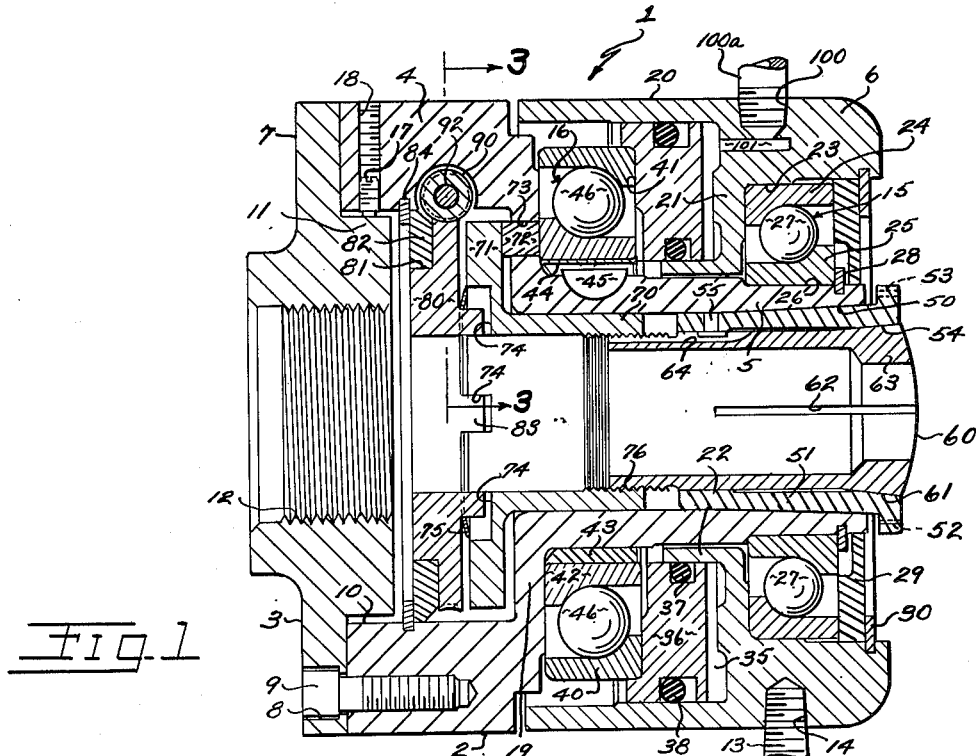
Figure 2:
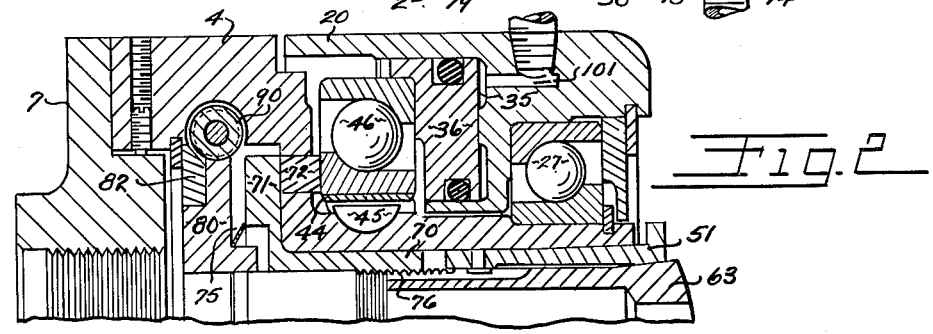
Figure 3:
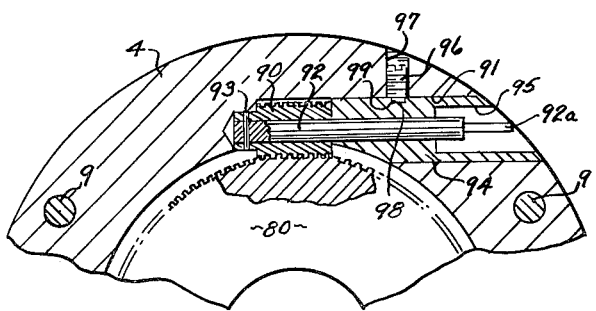

In the drawings:
FIG. 1 is a longitudinal vertical section of the first embodiment of the invention;
FIG. 2 is a fragmentary section similar to FIG. 1 showing certain parts of the device in other positions;
FIG. 3 is a fragmentary transverse section taken along the line 3—3 of FIG. 1;
FIG. 4 is a longitudinal vertical section of the second embodiment of the invention; and
FIG. 5 is a view similar to FIG. 3 and taken along the line 5—5 of FIG. 4.

Referring now to the drawings in all of which like parts are designated by like reference numerals and particularly to FIGS. 1–3, the first embodiment of the collet chuck is generally indicated at 1 and comprises a spindle 2 mounted upon a preferably circular machine adapter 3. The spindle base which is shown at 4 is substantially the same diameter as the machine adapter 3, and a forwardly directed, diametrically reduced, sleeve extension 5 of said spindle is encased within a cylindrical housing 6 of substantially the same diameter as the spindle base 4.

The machine adapter 3 has a circumferentially continuous, radiating flange 7 having a plurality of evenly spaced apertures therein as indicated at 8 through which cap screws 9 project to secure the same flatwise against the rearwardly directed face of the spindle base 4. The spindle 2 has an enlarged, concentric bore 10 extending forwardly from the rearmost face of the spindle base 4 into which a forwardly directed boss 11 of the machine adapter 3 loosely projects. The diameter of the bore 10 is substantially greater than the outer diameter of the sleeve extension 5, and the rearward end of the sleeve extension is connected at the forward end of the base 4 by means of a vertical, annular wall 19 as well shown in FIGS. 1 and 2. The machine adapter 3 is provided with a concentric, threaded bore 12 which is coaxial with the axis of the spindle 2 and which provides means for mounting the collet chuck 1 to a power driven spindle (not shown) of a conventional lathe.

From the foregoing it will be understood that the machine adapter 3 and the spindle 2 rotate unitarily with the rotation of the lathe to which they would be attached. The housing 6, on the other hand, is secured against rotation by any suitable means such as a fixed rod or bolt 13 thread fitted into said housing at an internally threaded socket 14 thereof.

Means is provided to afford relative rotation between the housing 6 and the spindle 2 in the form of ball bearing members 15 and 16. The ball bearing member 15 surrounds the sleeve extension 5 adjacent the forward end thereof and the ball bearing member 16 surrounds said sleeve extension in a rearward direction adjacent the annular wall 19. The housing 6 is centrally open whereby it is adapted to be positioned over and around the sleeve extension 5 and comprises a circumferentially continuous wall 20 having a radially inwardly projecting interior wall 21 the inner periphery of which has a rearwardly extending collar 22 which is loosely telescoped over the medial portion of the sleeve extension 5. Forwardly of the interior wall 21, the housing 6 provides a forwardly open socket 23 into which an outer bearing race 24 of the forward ball bearing member 15 is press fitted. An inner bearing race 25 is similarly press fitted upon a slightly diametrically reduced, front end portion 26 of the sleeve extension 5, and ball bearings 27 are disposed between said outer and inner bearing races. The inner bearing race 25 is retained upon the sleeve extension 5 by means of a snap ring 28 positioned within a suitable groove in the outer peripheral surface of the reduced portion 26 of the spindle. The opening between the outer and inner bearing races 24—25 is enclosed by means of an annular cover 29 which is in turn retained against the ball bearing member 15 by means of a snap ring 30 disposed within an inner peripheral groove of the socket 23.

The radial space between the collar 22 and the peripheral wall 20 of the housing 6 affords an annular piston chamber 35 which contains an annular piston 36, said piston being sealed against the collar 22 by a resilient O-ring 37 and against the circumferential wall 20 by a resilient O-ring 38. The O-rings 37 and 38 are seated within suitable inner and outer peripheral grooves of the piston 36 whereby said piston is maintained in fluid-tight contact with the walls of the annular piston chamber 35.

The ball bearing member 16 is disposed longitudinally between the annular wall 19 and the annular piston 36 and has an outer bearing race 40 press fittted into a rearwardly facing socket 41 of the piston and an inner bearing race 42 which is press fitted upon a bushing 43. Said bushing has a slot 44 at the inner periphery thereof by which it is keyed to the sleeve extension 5 by means of a key 45. Suitable ball bearings 46 are disposed between the inner and outer bearing races 42 and 40, respectively.

The resilient O-rings 37 and 38 provide sufficient friction between the annular piston 36 and the stationary housing 6 as to cause said piston and the outer bearing race 40 to remain fixed against rotation. The sleeve extension 5 and the inner bearing races 25 and 42 along with the keyed bushing 43 rotate together by means of the rolling contact afforded by the ball bearings 27 and 46.

The sleeve extension 5 has an inner peripheral surface which is flared slightly outwardly adjacent the forward end thereof as indicated at 50. A collet adapter 51 having outer peripheral wall surfaces which are complementarily formed to the flared portion of the sleeve extension 50 is telescopically disposed within said flared portion. The collet adapter 51 has a circumferentially continuous, radiating flange 52 at its outer end which is closely adjacent the forward face of the sleeve extension 5. Said flange has tapped holes 53 therein for the insertion of jack screws (not shown) by means of which the collet adapter may be removed from the flared portion 50 of the spindle extension. Normal operation of the collet chuck 1 causes the adapter 51 to become tightly wedged within the flared portion 50, and the use of jack screws facilitates its removal therefrom.

The collet adapter 51 has a generally cylindrical bore therethrough modified adjacent the forward end of said adapter by means of a conical, forwardly outwardly flared portion 54. A collet 60 slidably fits within the collet adapter 51, said collet having forwardly diverging, camming surfaces 61 adjacent the forward end thereof which engage the flared portion 54 of the collet adapter whereby said collet is radially inwardly compressed when it is pulled into the adapter in an axially rearward direction.

The collet 60 is sleeve-like in form with the rearwardly directed end thereof extending beyond the collet adapter 51 and with the forward end thereof having a plurality of longitudinal slots 62 which circumferentially divide the forward end of the collet into a plurality of gripping jaws 63. The collet is preferably made of a metal having sufficient inherent resilience as to allow the jaws 63 to be cammed radially inwardly to close upon a tool or workpiece when said collet is moved rearwardly through the collet adapter 51 without permanently deforming said collet.

The collet 60 is pulled rearwardly by means of a pull sleeve 70 which is slidably fitted within the bore of the sleeve extension 5 and has a circumferentially continuous, radiating flange 71 at the rearward end thereof disposed within the enlarged bore 10 of the spindle base 4. The flange 71 extends radially outwardly a distance substantially equal to the diameter of the inner bearing race 42 of the ball bearing member 16 and there abuts a plurality of circumferentially spaced pusher rods 82 which slidably project through suitable apertures 73 in the annular wall 19 of the spindle base 4. The pusher rods 72 abut the inner bearing race 42 of the ball bearing member 16 at their forward ends whereby axial movement of said ball bearing member effects a similar axial movement in the pull sleeve 70 in a manner to be herein later more fully described.

Between the rearmost end of the pull sleeve 70 and the machine adapter 3 there is provided a worm wheel 80 which has a journal portion 81 projecting in a rearward direction and rotatably mounted within a bearing 82. The worm wheel 80 has circumferentially spaced, forwardly longitudinally projecting teeth 83 which interfit slots 74 in the rearward end of the pull sleeve 70. A washer type spring 75 is interposed between the flange 71 and the worm wheel 80 whereby they are biased longitudinally apart from each other, and the bearing 82 which rotatably mounts said worm wheel is retained against rearward movement by means of a snap ring retainer 84 seated within a suitable internal peripheral groove of the enlarged bore 10. Between the worm wheel 80 and the bottom wall of the bore 10, there is sufficient space for longitudinal movement of the flange 71 in response to the pusher rods 72.

The forwardly directed end of the pull sleeve 70 is longitudinally spaced from the rearwardly directed end of the collet adapter 51 thereby allowing relative longitudinal movement between the two parts. The collet 60 extends through the collet adapter 51 with the rearward end of said collet projecting into the forward end of the pull sleeve 70. The rearward end of the collet 60 threadingly engages the forward end of the pull sleeve 70 as shown at 76, and the collet adapter 51 engages said collet by means of a key 55 of said adapter which projects into a longitudinally directed slot 64 in the outer peripheral surface of said collet. The collet 60 is, therefore, caused to rotate with the collet adapter 51 and the spindle 2, the pull sleeve 70 also rotating unitarily therewith due to the engagement of the teeth 83 of the worm wheel 80 in the slots 74 of the pull sleeve 70. Said worm wheel is, in turn, connected to rotate with the spindle 2 in a manner to be herein later fully disclosed. The collet 60 is free to move longitudinally relative to its own axis since the key 55 slides freely within the slot 64 thereof, and longitudinal axial movement of the pull sleeve 70 causes the collet to also move longitudinally due to the threaded engagement between the parts at 76.

Movement of the collet 60 through the pull sleeve 70 is effected in either of two ways: by rotation of the worm wheel 80 which rotates said adapter and causes it to more or less extensively engage the threads of said collet, or by longitudinal movement of the annular piston 36 which acts upon said pull sleeve through the ball bearing member 16 and the pusher rods 72.

Means for rotating the worm wheel 80 comprise a worm gear 90 which engages the worm wheel 80 (FIG. 3). The worm gear 90 is rotatively mounted within an aperture 91 which extends inwardly from the outer periphery of the spindle base 4 adjacent the periphery of the worm wheel 80. Said worm gear is mounted upon the inner end of a worm shaft 92 and is secured thereon by means of a cotter pin 93. A substantial portion of the worm shaft 92 is mounted within a split lock sleeve 94 which is disposed between the worm gear 90 and the outer periphery of the spindle base 4 and has an enlarged key socket 95 in the outer end thereof. A set screw 96 is thread fitted within a socket 97 intersectingly disposed at right angles to the lock sleeve 94, said set screw having a non-threaded portion 98 at its inner end which engages a suitable socket 99 in the periphery of the lock sleeve 94 to prevent said lock sleeve from rotating or moving axially. The set screw 96 is also situated in such manner that the tightening thereof inwardly toward the lock sleeve 94 causes said lock sleeve to close tightly upon the worm shaft 92 whereby said worm shaft is fixedly retained against rotation and this in turn prevents rotation of the worm gear 90. Said worm gear provides the connection between the worm wheel 80 and the spindle 2 whereby said worm wheel and said spindle rotate unitarily when the chuck is in operation.

The outer end of the worm shaft 92 has a flattened portion 92a adjacent the outer periphery of the spindle base 4, and it will be noted that that portion of said worm shaft including the flattened portion 92a which projects into the key socket 95 is radially spaced from the inner walls of said key socket. The key socket 95 is adapted to receive an actuating key or other similar tool (not shown) so formed at its end as to complementarily engage the end of the worm shaft 92 including the flattened portion 92a thereof. It will be readily seen that if the set screw 96 is loosened, such a tool may be used to rotate the worm shaft 92 thereby rotating the worm gear 90 and, consequently, the worm wheel 80.

The pull sleeve 70 may be rotated in either direction by means of the worm gear 90 and the worm wheel 80 whereby to either pull the collet 60 more tightly within the collet adapter 51 thereby closing the jaws 63 or to extend said collect forwardly and outwardly to open said jaws more widely.

Actuation of the annular piston 36 is by means of a suitable fluid medium which is introduced into the annular piston chamber 35 in front of said piston through a connector socket 100 and an inter-connecting passageway 101. The connector socket 100 is adapted to receive a threaded connector 100a carrying a pressurized fluid such as air, from any suitable source (not shown). For the purpose of operating the collet chuck by the fluid medium, said source would also include conventional control means (also not shown) whereby the fluid may be alternately introduced and exhausted from the annular piston chamber 35. In FIG. 1 of the drawings, the piston 36 is shown in its rearmost position or as it would look with the pressurized fluid being directed into the annular piston chamber, and in FIG. 2 said piston is shown in its foremost position after the fluid has been exhausted. It will be noted that in the rearmost position the ball bearing member 16 is positioned all the way to the left or rearwardly whereby it abuts the annular wall 19 and whereby the pusher rods 72 extend a maximum distance rearwardly through the aperture 73 to retract the pull sleeve 70. Under these conditions, the washer type spring 75 is compressed between the pull sleeve 70 and the worm wheel 80, said spring subsequently causing said pull sleeve and the collet 60 as well as the ball bearing member 16 and the piston 36 to move forwardly when the pressure in front of said piston is relieved as shown in FIG. 2. Thus, introduction of fluid into the annular chamber 35 causes a rearward movement of the collet 60 and a closing of the collet jaws 63; and a release of the pressure from in front of the piston causes said collet to move forwardly thereby opening said jaws.

In operation, the collet chuck 1 is mounted upon a rotary type machine such as a lathe by means of the machine adapter 3 and its threaded bore 12. The spacing or the degree of openness of the jaws 63 of the collet 60 is initially adjusted to the particular tool or workpiece to be gripped thereby by means of the worm gear 90 and the worm wheel 80. Pressurized fluid is then introduced into the annular piston chamber 35 in front of the annular piston 36 thereby closing the collet jaws 63 tightly upon the tool or workpiece inserted therebetween.

If the collet chuck is used in conjunction with a workpiece which is to be fed progressively through the chuck whereby it is desired to alternately grip and release the workpiece in sequential progressive movements, the initial adjustment of the collet jaws by the worm gear and worm wheel is such as to allow a sliding movement between the collet and the workpiece. Thereafter, the workpiece may be gripped by the collet by the application of fluid into the chamber 35, and alternatively, said workpiece may be released when desired by exhausting the fluid from said chamber. Actuation of the collet 60 through the annular piston 36 may be accomplished even during rotation of the workpiece due to the fact that the housing 6 through which the fluid is connected is stationary at all times.

During rotation of the machine tool to which the collet chuck is attached the spindle 2, machine adapter 3, worm wheel 80, collet adapter 51 and the inner bearing race 25 of the ball bearing member 15 all rotate unitarily. The collet 60, the pull sleeve 70, and the inner bearing race 42 of the ball bearing member 16 also rotate with the spindle and its associated parts but are additionally capable of slight longitudinal movement in response to pressure exerted thereupon either by the annular piston 36 or the spring 75. The annular piston 36 and the outer bearing race 40 of the ball bearing member 16 are capable of longitudinal movement only but remain rotatively stationary with the housing 6.

Means are provided in association with the collet chuck of this invention whereby when said chuck is mounted to the rotary machine tool, minor errors in concentricity between the axis of the machine and the axis of the collet 60 may be compensated for. It will be noted that the boss 11 of the machine adapter 3 is radially spaced a small amount from the periphery of the enlarged bore 10 of the spindle base 4. It will be further noted that the aperture 8 in the flange 3 of the machine adapter is slightly oversize relative to the shanks and heads of the cap screws 9. A plurality of circumferentially spaced adjusting screws 17 are disposed within radially directed, tapped bores 18 which extend through the spindle 4 forwardly of the snap ring retainer 84 in the area of the boss 11. Said adjusting screws project inwardly into the enlarged bore 10 with their inner ends bearing upon the outer peripheral surface of the boss 11. With the cap screws 9 slightly loosened, it will be readily seen that the collet chuck 1 can be axially adjusted into perfect alignment with the machine adapter which is co-axial with the lathe. The cap screws 9 are then tightened to insure that the collet 60 is maintained in its concentric position.

The second embodiment of the invention is similar in operation to the first form with the exception that it is adapted for use in a machine, such as a milling machine, wherein the tool or workpiece to be gripped is not rotated. The primary difference between the two forms is, therefore, that whereas in the first form means is provided for rotatively mounting the spindle and chuck, in the second form such means is unnecessary.

Referring now to the drawings, and particularly to FIGS. 4 and 5, the collet chuck of the second embodiment comprises a spindle 102 having a base 104 with a radially projecting flange 103 adjacent its rearmost end, and a forwardly projecting, sleeve extension 105. The flange 103 has outwardly opened circumferentially evenly spaced notches 103a adapted to receive the shanks of bolts (not shown) whereby it is securely mounted to the machine tool. The notches 103a are radially deeper than the diameter of bolts adapted to be used therewith whereby the spindle 102 may be vertically and horizontally adjusted to correctly align the axis of the chuck with the machine.

A housing 106 is centrally bored to closely, telescopically fit over the sleeve extension 105 and has a rearwardly projecting, outer circumferential wall 120 and a rearwardly projecting inner peripheral collar 122. The diameter of the outer wall 120 is the same as the diameter of the spindle 102, and the rearwardly directed edge of said wall abuts a forward face of the base 104 as indicated at 104a. The collar 122 is longitudinally spaced somewhat from the forward face 104a, and the space between said collar and the peripheral wall 120 comprises an annular piston chamber 135 which houses an annular piston 136. Resilient O-rings 137 and 138 are seated within suitable inner and outer grooves respectively of the annular piston whereby said piston is sealed relative to the walls of the annular piston chamber 135. The entire housing and piston assembly is securely held upon the sleeve extension 105 by means of a snap ring 130 seated in a suitable circumferential groove in the outer periphery of said sleeve extension.

The inner peripheral surface of the sleeve extension 105 diverges in a forward direction to provide a flared portion 150 into which is wedgingly fitted a collet adapter 151. The collet adapter 151 is identical with the collet adapter 51 of the first form of this invention, said adapter also having a radiating flange 152 at the forward end thereof wherein are provided tapped holes 153 for positioning jack screws when it is desired to remove said adapter from the sleeve extension 105. The collet adapter 151 also has a forwardly directed, flared portion 154 adapted to cammingly close jaws 163 of a collet 160. The collet 160, like the collet 60 of the first embodiment, has a plurality of longitudinal slots 162 and camming surfaces 161 whereby the jaws are cammed radially inwardly and the slots are closed whenever said collet is moved in a rearward direction.

The rearmost end of the collet 160 extends rearwardly well beyond the collet adapter 151 and is provided with a longitudinal slot 164 in its outer peripheral surface which receives a key 155 extending radially inwardly from the collet adapter 151. Thus it will be seen that the collet 160 can move axially during which time the key 155 slides within the groove 164 but that said collet is maintained against rotation within the collet adapter 151 by the said key 155.

The rearmost end of the spindle base 104 has a rearwardly open, enlarged recess or bore 110 into which a worm gear mechanism and a pull sleeve are mounted in generally the same manner as in the first embodiment of the invention. The diameter of the bore 110 is substantially larger than the sleeve extension 105 and the two elements are joined by a vertically disposed, annular wall 119. A pull sleeve 170 projects forwardly into the sleeve extension 105 of the spindle and threadingly engages the rearwardly projecting end of the collet 160 as indicated at 176. The rearmost end of the pull sleeve 170 has a circumferentially continuous, radiating flange 171 and rearwardly open, circumferentially spaced notches 174. A worm wheel 180 having a rearwardly projecting journal portion 181 is rotatively mounted within a bearing 182 which is retained within the enlarged bore 110 by means of a snap ring retainer 184. The worm wheel 180 is driven by a worm gear 190 in the same manner as the worm gear 90 of the first embodiment of the invention.

The worm wheel 180 has forwardly projecting teeth 183 which interfit the notches 174 of the pull sleeve 170 to cause rotation of said pull sleeve whenever the worm wheel rotates. A washer type spring 175 is interposed between the worm wheel 180 and the flange 171 of the pull sleeve 170 in such manner as to bias the two parts away from each other and to urge said pull sleeve forwardly whereby the jaws 163 of the collet 160 tend to open. Rearward movement of the pull sleeve 170 to close the collet jaws is effected through a plurality of pusher rods 172 which slidably project through suitable apertures 173 in the annular wall 119. The pusher rods 172 are interposed between the flange 171 and a spacer ring 177 which is tightly seated within a recess 178 in the rearwardly directed face of the annular piston 136.

As best shown in FIG. 5 the worm gear 190 is mounted within an outwardy open aperture 191 in the base 104 in substantially the same manner as the mounting of worm gear 90. The worm gear 190 is fixedly mounted upon a worm shaft 192 by means of a cotter pin 193, and its outer journal portion is rotatively mounted within a longitudinally split lock sleeve 194. Said lock sleeve has a key socket 195, and the outer end of the worm shaft 192 has a flattened portion 192a for receiving a key or tool (not shown) whereby said worm shaft, worm gear, and worm wheel may be rotated to move the collet 160. The worm shaft may be locked against rotation by means of a set screw 196 disposed in a threaded socket 197 of the base and having a non-threaded portion 198 disposed within a socket 199 in the outer periphery of said lock sleeve.

The pressurized fluid medium for actuating the annular piston 136 is introduced into the annular piston chamber 135 through a connector socket 200 and an interconnecting passageway 201 of the housing 106. The operation of the mechanism for closing the collet 160 is the same as that found in the first embodiment of the invention whereby an initial adjustment of the collet may be made by rotating the worm wheel 180 in either direction through the worm gear 190. Subsequent closing of the jaws 163 can then be effected by the controlled introduction of fluid into the annular piston chamber 135 thereby causing the annular piston 136 to move rearwardly and carry with it the pull sleeve 170. As in the first form of the invention, this pulls the collet 160 rearwardly and more deeply into the collet adapter 151 whereby the interacting surfaces 154 and 161 effect the closing of the collet. Upon release of the pressure from the piston chamber 135, the spring 175 automatically returns the pull sleeve 170 to a forward position thereby moving the collet forwardly and releasing the jaws.

In either form of the invention a complete closing of the collet jaws upon a tool or workpiece may be effected by the worm gear and worm wheel alone if so desired or if for any reason fluid power is not available. The worm wheel and the worm gear arrangement is particularly suited for this purpose in that although rotation of the worm gear will cause consequent rotation of the worm wheel, said worm wheel cannot be moved to cause rotation of the worm gear. Therefore, once the chuck is manually tightened through the worm gear, it cannot be loosened except by rotation of said gear in the opposite direction. The set screws (96—196) and the split sleeves (94—194) are provided as an additional safety feature against accidental rotation of the worm shaft.

It will be understood that many changes in the details of this invention may be made without, however, departing from the spirit thereof or the scope of the appended claims.

What is claimed is:

1. A collet chuck comprising a spindle having a forwardly projecting sleeve extension; a collet mounted within said sleeve extension in such manner as to be compressed by rearward axial movement and released by forward axial movement within said sleeve extension; a housing mounted to said spindle; a pull sleeve connected to said collet in such manner that either axial movement or rotation of said pull sleeve causes axial movement of said collet; means for rotating said pull sleeve; piston means disposed within said housing and axially movable therein; means operatively connecting said piston means with said pull sleeve whereby actuation of said piston means axially moves said collet in a rearward direction; and means normally urging said collet in a forward direction.

2. A collet chuck comprising a spindle having a forwardly projecting, diametrically reduced sleeve extension; a collet mounted within said sleeve extension in such manner as to be compressed by rearward axial movement and released by forward axial movement within said sleeve extension; a housing surrounding said sleeve extension; a pull sleeve connected to said collet in such manner that either axial movement or rotation of said pull sleeve causes axial movement of said collet; means for rotating said pull sleeve; piston means disposed within said housing and axially movable therein; means operatively connecting said piston means with said pull sleeve whereby actuation of said piston means axially moves said collet in a rearward direction; and means normally urging said collet in a forward direction.

3. A collet chuck comprising a spindle having a forwardly projecting, diametrically reduced sleeve extension; a collet mounted within said sleeve extension in such manner as to be compressed by rearward axial movement and released by forward axial movement within said sleeve extension; a housing surrounding said sleeve extension and defining an annular piston chamber around said sleeve extension; an annular piston disposed within said chamber and axially movable therein; a pull sleeve connected to said collet in such manner that either axial or rotative movement of said pull sleeve causes axial movement of said collet; means for rotating said pull sleeve; means operatively connecting said piston with said pull sleeve in such manner that actuation of said piston axially moves said collet in a rearward direction; and means normally urging said collet in a forward direction.

4. A collet chuck comprising a spindle having a forwardly projecting, diametrically reduced sleeve extension; a collet mounted within said sleeve extension in such manner as to be compressed by rearwardly axial movement and released by forward axial movement within said sleeve extension; a housing surrounding said sleeve extension; a pull sleeve connected to said collet in such manner that either axial movement or rotation of said pull sleeve causes axial movement of said collet; a worm wheel mounted coaxially with and rotatively connected with said pull sleeve; a worm gear operatively connected to rotate said worm wheel; said pull sleeve being axially movable toward and away from said worm wheel; piston means disposed within said housing and axially movable therein; means operatively connecting said piston means with said pull sleeve whereby actuation of said piston means axially moves said collet in a rearward direction; and means normally urging said collet in a forward direction.

5. A collet chuck comprising a spindle having a forwardly projecting, diametrically reduced sleeve extension; a collet mounted within said sleeve extension in such manner as to be compressed by rearward axial movement and released by forward axial movement within said sleeve extension; a housing surrounding said sleeve extension and defining an annular piston chamber around said sleeve extension; an annular piston disposed within said chamber and axially movable therein; a pull sleeve connected to said collet in such manner that either axial or rotative movement of said pull sleeve causes axial movement of said collet; a worm wheel mounted coaxially with and rotatively connected with said pull sleeve; a worm gear operatively connected to rotate said worm wheel; said pull sleeve being axially movable toward and away from said worm wheel; means operatively connecting said piston with said pull sleeves in such manner that actuation of said piston axially moves said collet in a rearward direction; and means normally urging said collet in a forward direction.

6. A collet check comprising a spindle having a hollow base and a forwardly projecting, diametrically reduced sleeve extension; a collet mounted within said sleeve extension in such manner as to be compressed by rearward axial movement within said sleeve extension; a housing surrounding said sleeve extension and defining an annular piston chamber around said sleeve extension; an annular piston disposed within said chamber; a pull sleeve slidably mounted within said sleeve extension rearwardly of said collet and having a radiating flange disposed within said hollow base; pusher means disposed between said flange and said piston; said pull sleeve threadingly connected to said collet whereby rotation of said pull sleeve effects rearward axial movement of said collet within said sleeve extension; a worm wheel disposed rearwardly adjacent said pull sleeve and connected to said pull sleeve in such manner as to effect unitary rotation therewith; a worm gear mounted in said spindle in engagement with said worm wheel for rotating said worm wheel; spring means disposed between said worm wheel and said pull sleeve normally urging said collet forwardly; said housing affording passage means for introducing pressurized fluid into said annular chamber forwardly of said piston whereby said piston moves rearwardly to effect a similar movement in said collet through said pusher means and said pull sleeve.

7. In a machine tool, a collet chuck for rotating a tool or workpiece comprising a spindle having a hollow base and a forwardly projecting, diametrically reduced sleeve extension; a collet mounted within said sleeve extension in such manner as to be compressed by rearward axial movement and released by forward axial movement; a fixed housing surrounding said sleeve extension and defining an annular piston chamber around said sleeve extension; adapter means for mounting said spindle to a rotary machine tool; said spindle rotatable relative to said housing; an annular piston disposed within said chamber and axially movable therein; a pull sleeve connected to said collet in such manner that either axial or rotative movement of said pull sleeve causes axial movement of said collet; means for rotating said pull sleeve; means operatively connecting said piston with said pull sleeve in such manner that actuation of said piston axially moves said collet in a rearward direction; and means normally urging said collet in a forward direction.

8. A collet chuck as set forth in claim 7 wherein the recited means for rotating said pull sleeve comprises a worm wheel positioned adjacent and coaxial with said pull sleeve; said pull sleeve being rotatively locked with said worm wheel in such manner as to be axially movable relative thereto; spring means disposed between said pull sleeve and said worm wheel whereby said pull sleeve is biased in a forward direction; and a worm gear operatively connected to said worm wheel having means accessible from outside said spindle for rotating said worm gear.

9. A collet chuck as set forth in claim 7 including means for relative rotation between said sleeve extension and said housing; said means comprising a first ball bearing member adjacent the forward end of said sleeve extension and a second ball bearing member adjacent the rearward end thereof; said first ball bearing member being axially stationary and connected between said housing and said spindle; said second ball bearing member being keyed to said spindle and connected between said piston and said spindle and movable axially in response to movement of said piston; said pull sleeve having a radiating flange having longitudinally extending pusher means projecting therefrom which abut said second ball bearing member to effect axial movement of said pull sleeve in response to axial movement of said second ball bearing member.

10. A collet chuck as set forth in claim 7 wherein the recited hollow base has a rearwardly open bore and wherein the recited adapter means has a forwardly projecting boss loosely interfitting said bore; said base having radially acting adjusting means adjustably positioning said boss within said bore to effect perfect concentricity between said adapter means and said spindle.

11. A collet chuck as set forth in claim 7 wherein the recited sleeve extension has a collet adapter tightly fitted within the forward end thereof; said collet mounted within said collet adapter; said collet and said collet adapter having interacting surfaces which effect a compression of said collet when it is moved rearwardly; said collet having a rearmost end portion extending beyond said collet adapter; said collet keyed to said collar in such manner as to prevent relative rotation between said collet and said collet adapter; and said pull sleeve thread fitted to the rearmost end portion of said collet.

12. A collet chuck as set forth in claim 8 wherein the recited worm gear is fixedly mounted upon a concentric worm shaft; said worm shaft journaled within a longitudinally split lock sleeve disposed within an outwardly open bore of said base; set screw means intersecting the bore in such manner as to bring pressure to bear upon said lock sleeve to effect a closing thereof upon said worm shaft whereby said shaft is securely held; and said lock sleeve and said worm shaft adapted to receive tool means for rotating said worm shaft and said worm gear.

13. In a rotary type machine tool, a collet chuck comprising a hollow base and a forwardly projecting sleeve extension connected by a vertical, annular wall; a fixed housing rotatively mounted on said sleeve extension by forward and rearward bearing means; said housing defining an annular piston chamber between said bearing means; an axially movable annular piston disposed within said chamber; said forward bearing means rotatably mounting said sleeve extension for rotation in said housing; said rearward bearing means rotatably mounting said sleeve extension for rotation in said piston and axially movable with said piston; a collet mounted within the forward end of said sleeve extension in such manner as to be compressed by rearward axial movement within said sleeve extension; an axially movable pull sleeve thread fitted to the rearward end of said collet and having a radiating flange disposed within said hollow base and overlapping said annular wall; a worm wheel disposed rearwardly adjacent said pull sleeve and rotatively locked to said pull sleeve whereby said pull sleeve is rotated to move said collet rearwardly or forwardly; spring means disposed between said worm wheel and said pull sleeve urging said pull sleeve in a forward direction; a worm gear operatively connected to said worm wheel having means accessible from outside said base for rotating said worm wheel; pusher means projected through openings in said annular wall and disposed between said rearward bearing means and said flange of said pull sleeve whereby axial movement of said bearing effects axial movement of said pull sleeve; and said housing affording passage means for introducing pressurized fluid into said annular chamber forwardly of said piston whereby said piston is moved axially rearwardly.

14. In a machine tool, a collet chuck for rigidly holding a tool or workpiece comprising a spindle having a base for fixedly attaching it to a machine tool and a forwardly projecting, diametrically reduced sleeve extension; said base having a bore therein coaxial with said sleeve extension and of greater diameter than said sleeve extension; a vertically disposed, annular wall connecting the rearmost end of said sleeve extension with the forward end of said base; a fixed housing surrounding said sleeve extension and defining an annular piston chamber; an axially movable, annular piston disposed within said chamber; a collet disposed within said sleeve extension in such manner as to be compressed when moved rearwardly and released when moved forwardly; an axially movable pull sleeve slidably disposed in said sleeve extension rearwardly of said collet and thread fitted to said collet whereby either rotative or rearward movement of said pull sleeve moves said collet rearwardly; a worm wheel disposed coaxially with and rearwardly of said pull sleeve and rotatively connected to drive said pull sleeve; a worm gear operatively connected with said worm wheel and having means accessible from outside said base for rotating said worm wheel; spring means disposed between said worm wheel and said pull sleeve urging said pull sleeve and collet in a forward direction; said pull sleeve having a radiating flange disposed within said bore and radially overlapping said piston; and pusher means projecting through aperture means in said annular wall operatively connecting said flange and said piston in such manner that said pull sleeve is moved rearwardly in response to actuation of said piston.

15. A collet chuck comprising a spindle having a forwardly projecting sleeve extension; a collet mounted within said sleeve extension in such manner as to be compressed by rearward axial movement and released by forward axial movement within said sleeve extension; said collet being normally in a forward, released position; a housing mounted to said spindle; a pull sleeve connected to said collet in such manner that either axial movement or rotation of said pull sleeve causes axial movement of said collet; means for rotating said pull sleeve; power means disposed within said housing and operatively connected to said pull sleeve whereby actuation of said power means axially moves said collet in a rearward direction.

16. A collet chuck comprising a hollow spindle; a collet mounted within said spindle in such manner as to be compressed by rearward axial movement and released by forward axial movement within said spindle; said collet being normally in a forward, released position; a housing mounted to said spindle; a pull sleeve connected to said collet in such manner that either axial movement or rotation of said pull sleeve causes axial movement of said collet; means for rotating said pull sleeve; power means disposed within said housing and operatively connected to said pull sleeve whereby actuation of said power means axially moves said collet in a rearward direction.

17. A collet chuck comprising a spindle having a forwardly projecting sleeve extension; a collet mounted within said sleeve extension in such manner as to be compressed by rearward axial movement and released by forward axial movement within said sleeve extension; said collet being normally in a forward, released position; a pull sleeve connected to said collet in such manner that either axial movement or rotation of said pull sleeve causes axial movement of said collet; means for rotating said pull sleeve; power means mounted to said spindle and operatively connected to said pull sleeve whereby actuation of said power means axially moves said collet in a rearward direction.

18. A collet chuck comprising a hollow spindle; a collet mounted within said spindle in such manner as to be compressed by rearward axial movement and released by forward axial movement within said spindle; said collet being normally in a forward, released position; a pull sleeve connected to said collet in such manner that either axial movement or rotation of said pull sleeve causes axial movement of said collet; means for rotating said pull sleeve; power means mounted to said spindle and operatively connected to said pull sleeve whereby actuation of said power means axially moves said collet in a rearward direction.

19. A collet chuck comprising a hollow spindle; a collet mounted within said spindle in such manner as to be compressed by axial movement in one direction and released by axial movement in the opposite direction; said collet being normally in a released position; a pull member connected to said collet in such manner that either axial movement or rotation of said pull member causes axial movement of said collet; means for rotating said pull member; power means mounted to said spindle and operatively connected to said pull member whereby actuation of said power means axially moves said collet toward a compressed position.

References Cited in the file of this patent
UNITED STATES PATENTS

| 2,477,773 | Soussloaf | Aug. 2, 1949 |
| 2,504,186 | De Munck | Apr. 18, 1950 |
| 2,562,134 | Smitka | July 24, 1951 |